UNITED STATES PATENT OFFICE.

HUGO GELDERMANN, OF GROSS-LICHTERFELDE-OST, NEAR BERLIN, GERMANY, ASSIGNOR TO ACTIEN GESELLSCHAFT FÜR ANILIN FABRIKATION, OF BERLIN, GERMANY.

MORDANT-DYEING AZO DYE.

943,536. Specification of Letters Patent. Patented Dec. 14, 1909.

No Drawing. Application filed August 2, 1909. Serial No. 510,718.

*To all whom it may concern:*

Be it known that I, HUGO GELDERMANN, a subject of the German Empire, residing at Gross-Lichterfelde-Ost, near Berlin, Germany, whose post-office address is Grabenstrasse 12, Gross-Lichterfelde-Ost, near Berlin, Germany, have invented certain new and useful Improvements in Mordant-Dyeing Azo Dye, of which the following is a specification.

I have discovered that a new azo-coloring matter can be obtained by combining the diazo compound of ortho-chloro-para-nitranilin with an ortho-oxycarbonic acid of the benzene series. The products, which I thus obtain, dye wool in acid bath orange shades, which by subsequent treatment with chromium salts are converted into a brick-red, distinguished by its fastness to the action of alkalies, acids and light.

For practically carrying out my invention I may proceed as follows, the parts being by weight: 17.2 parts of ortho-chloro-para-nitranilin are diazotized in the usual manner in an aqueous solution by means of 7 parts of sodium nitrite and 60 parts of hydrochloric acid of 21° Baumé. The solution of the diazo compound thus obtained is allowed to run into an aqueous solution of the sodium salt of 14 parts of salicylic acid and 60 parts of sodium carbonate. The coloring matter separates immediately and as soon as its formation is finished is isolated by filtering, pressing and drying. The dyestuff thus obtained when pulverized forms a reddish-brown powder which dissolves in water to a reddish orange solution, which on the addition of concentrated soda-lye turns to cherry-red, and which solution on addition of diluted hydrochloric acid separates orange-brown flakes. The new coloring matter is slightly soluble in alcohol with reddish-brown coloration and dissolves in concentrated sulfuric acid to a dark orange solution.

If for the salicylic acid ortho- or para-cresotinic acid is substituted a dyestuff is obtained which possesses the same properties and dyes a slightly more reddish shade on chromium mordanted wool.

Having now described my invention and the manner in which it may be carried out, what I claim is,—

1. The herein-described azo-dyes which can be obtained by diazotizing ortho-chloro-para-nitranilin and combining the diazo compound thus obtained with an ortho-oxycarbonic acid of the benzene series which new dyestuffs dye wool from an acid bath orange shades, which shades on a subsequent treatment with chromium compounds are converted into brick-red tints, these tints being distinguished by a great fastness and which coloring matters form when pulverized reddish-brown powders dissolving in water to a reddish-orange solution and in alcohol to a reddish-brown solution and in concentrated sulfuric acid to a dark orange solution.

2. The herein-described azo-dye which can be obtained by diazotizing ortho-chloro-para-nitranilin and combining the diazo compound thus obtained with salicylic acid, which new dyestuff dyes wool from an acid bath an orange shade, which shade on a subsequent treatment with chromium-compounds is converted into a brick-red tint, this tint being distinguished by its great fastness and which coloring matter forms when pulverized a reddish brown powder dissolving in water to a reddish-orange solution, which on the addition of concentrated soda-lye turns to cherry-red, and which solution on addition of diluted hydrochloric acid separates orange-brown flakes, and which coloring matter dissolves in alcohol to a reddish-brown solution and in concentrated sulfuric acid to a dark orange solution.

In testimony whereof I have hereunto set my hand in presence of two subscribing witnesses.

HUGO GELDERMANN.

Witnesses:
HENRY HASPER,
ARTHUR SCHROEDER.